（12）United States Patent
Rumler et al.

(10) Patent No.: US 12,123,605 B2
(45) Date of Patent: Oct. 22, 2024

(54) SENSOR SYSTEM FOR LEAK DETECTION AND MANAGEMENT IN HEATING, VENTILATING, AND AIR CONDITIONING (HVAC) SYSTEMS

(71) Applicant: Johnson Controls Tyco IP Holdings LLP, Milwaukee, WI (US)

(72) Inventors: Daniel R. Rumler, New Berlin, WI (US); Denis Sterjo, Milwaukee, WI (US); Rex Jeremiah Allen, Milwaukee, WI (US); Daniel Disch, Brookfield, WI (US); Dominika Steinova, Wauwatosa, WI (US); Mylsamy M., Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 17/406,890

(22) Filed: Aug. 19, 2021

(65) Prior Publication Data
US 2023/0058790 A1    Feb. 23, 2023

(51) Int. Cl.
*F24F 11/36* (2018.01)
*F24F 11/77* (2018.01)
(Continued)

(52) U.S. Cl.
CPC ............... *F24F 11/36* (2018.01); *F24F 11/77* (2018.01); *F24F 11/86* (2018.01); *G05B 19/042* (2013.01);
(Continued)

(58) Field of Classification Search
CPC . F24F 11/36; F24F 11/77; F24F 11/86; G05B 19/042; G05B 2219/25257; G05B 2219/2614
See application file for complete search history.

(56) References Cited

U.S. PATENT DOCUMENTS 6,644,047 B2    11/2003 Taira et al.
8,058,070 B2    11/2011 Minor et al.
(Continued)

FOREIGN PATENT DOCUMENTS

EP    3150943 A1    5/2017
JP    2012127519 A    5/2012
WO   2015032905 A1   12/2015

OTHER PUBLICATIONS

Tags, Alvi "Refrigerants Gas Leak Detectors—R32." Alvi Automation—GasAlarm, Jun. 19, 2019, https://www.alviautomation.com/refrigerants-gas-leak-detectors-r32/.
(Continued)

*Primary Examiner* — Michael W Choi
(74) *Attorney, Agent, or Firm* — Fletcher Yoder, P.C.

(57) ABSTRACT

A system that includes a heating, ventilation, and air conditioning (HVAC) system that includes a sensor system within the HVAC system. The refrigerant sensor system includes a refrigerant sensor that detects the presence of an amount of refrigerant in the HVAC system and a control system that receives the amount of refrigerant detected from the refrigerant sensor. The control system also determines the amount of refrigerant exceeds a threshold value. Additionally, the control system sends one or more output signals to one or more components that are configured to couple to one or more devices that are part of the HVAC system. The one or more components are configured to cause the one or more devices to adjust operations based on the state of the components. The sensor system also includes a housing that encloses the refrigerant sensor and control system.

15 Claims, 6 Drawing Sheets

(51) Int. Cl.
    *F24F 11/86*         (2018.01)
    *G05B 19/042*      (2006.01)

(52) U.S. Cl.
    CPC .............. *G05B 2219/25257* (2013.01); *G05B 2219/2614* (2013.01)

(56) References Cited

U.S. PATENT DOCUMENTS

| | | |
|---|---|---|
| 10,151,663 B2 | 11/2018 | Scancarello |
| 10,527,310 B2 | 7/2020 | Nagaoka et al. |
| 11,125,457 B1 * | 9/2021 | Alfano ..................... F24F 11/56 |
| 2018/0119998 A1 | 5/2018 | Suzuki et al. |
| 2018/0231260 A1 * | 8/2018 | Wilson ................ F24D 19/1096 |
| 2020/0248919 A1 * | 8/2020 | Green .................. G05B 19/042 |
| 2020/0271344 A1 * | 8/2020 | Ikeda ........................ F24F 11/36 |
| 2022/0128278 A1 * | 4/2022 | Parker .................... F25B 49/02 |
| 2022/0243940 A1 * | 8/2022 | Notaro .................... F24F 11/77 |

OTHER PUBLICATIONS

"Integrated IR (INIR) Gas Sensors for R32 & R290." Mouser, Nov. 19, 2019, https://www.mouser.in/new/amphenol-sgx-sensortech/amphenol-sgx-inir-sensors-r32-r290/.

* cited by examiner

SENSOR SYSTEM FOR LEAK DETECTION AND MANAGEMENT IN HEATING, VENTILATING, AND AIR CONDITIONING (HVAC) SYSTEMS

BACKGROUND

The present disclosure relates generally to heating, ventilating, and air conditioning (HVAC) systems. More particularly, the present disclosure is related to refrigerant leak management for HVAC systems.

Residential, light commercial, commercial, and industrial HVAC systems are used to control temperatures and air quality in residences and buildings. Generally, the HVAC systems may circulate a refrigerant through a closed refrigeration circuit between an evaporator, where the refrigerant absorbs heat, and a condenser, where the refrigerant releases heat. The refrigerant flowing within the circuit is generally formulated to undergo phase changes within the normal operating temperatures and pressures of the system so that quantities of heat can be exchanged by virtue of the latent heat of vaporization of the refrigerant. As such, the refrigerant flowing within a HVAC system travels through multiple conduits and components of the circuit. Inasmuch as refrigerant leaks compromise system performance or result in increased costs, it is accordingly desirable to provide detection and response systems and methods for the HVAC system to reliably detect and respond to any refrigerant leaks of the HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a heating, ventilation, and air conditioning (HVAC) system, and a sensor system disposed within the HVAC system. The sensor system includes a refrigerant sensor configured to detect an amount of refrigerant, and a control system that receives the amount of refrigerant from the refrigerant sensor. Then control system then determines that the amount of refrigerant exceeds a threshold, and sends one or more signals to one or more components in response to the amount of refrigerant exceeding the threshold. The one or more components are configured to couple to one or more devices that are part of the HVAC system, and the one or more components are configured to cause the one or more devices to adjust one or more operations based on one or more states of the one or more components. The sensor system also includes a housing configured to enclose the refrigerant sensor and the control system.

In another embodiment, a method includes receiving, via a processor, refrigerant concentration data from a refrigerant sensor disposed within a housing along with the processor. The method further includes determining, via the processor, that the refrigerant concentration data exceeds a threshold value, and sending, via the processor, one or more signals to one or more components in response to determining that the refrigerant concentration data exceeds the threshold value. Additionally, the one or more components can change states based on the one or more signals, and the one or more components are configured to couple to one or more devices configured to control one or more operations of a heating, ventilation, and air conditioning (HVAC) system.

In an additional embodiment, a sensor device includes an R32 refrigerant sensor configured to detect refrigerant concentration data, and a microcontroller. The microcontroller is configured to receive the refrigerant concentration data, and determine that the refrigerant concentration data exceeds a threshold value. The sensor device also enables sending one or more signals to one or more components in response to determining that the refrigerant concentration data exceeds the threshold value. Further, the one or more components are configured to change states based on the one or more signals, and the one or more components are configured to couple to one or more devices configured to control one or more operations of a heating, ventilation, and air conditioning (HVAC) system. The sensor device also includes a housing configured to enclose the R32 sensor, the microcontroller, and the one or more components.

Other features and advantages of the present application will be apparent from the following, more detailed description of the embodiments, taken in conjunction with the accompanying drawings which illustrate, by way of example, the principles of the application.

BRIEF DESCRIPTION OF THE DRAWINGS

These and other features, aspects, and advantages of the embodiments described in the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed above, a HVAC system generally includes a refrigerant flowing within a refrigeration system. However, the refrigerant may inadvertently leak from a flow path of the refrigeration system due to wear or damage to components, faulty joints, or connections within the refrigeration system at some point after installation. If undetected, leaking refrigerant may compromise system performance or result in increased costs. As such, present techniques enable HVAC systems to reliably detect and manage refrigerant leaks.

With the foregoing in mind, present embodiments are directed to a refrigerant leak sensor system that is capable of detecting and/or mitigating refrigerant leaking from a refrigeration circuit of a HVAC system. The disclosed refrigerant sensor system may include a power source (e.g., power converters, voltage inputs), an R32 (e.g., difluoromethane) refrigerant sensor, and a control unit (e.g., microcontroller) coupled to one or more electrical components (e.g. relay switch devices, triode for alternating current (TRIAC)) that may implement power control operations corresponding to one or more fans, compressors, heaters, or other electrical devices of the HVAC system. The control unit may implement override output conditions that may correspond to industry standards (e.g., ASHRAE 15-2019). The R32 refrigerant sensor of the HVAC system may detect a concentration of refrigerant, and send the refrigerant concentration data to the microcontroller. The microcontroller may determine from the refrigerant concentration data that a refrigerant leak has occurred in the HVAC system based on the refrigerant concentration exceeding a predetermined threshold. In response to detecting that a refrigerant leak has occurred, the microcontroller may send control signals that may cause other equipment or devices to perform certain mitigation operations, such as shutting off compressors and electrical devices and continue operating one or more supply air fans for a specified duration (e.g., delay time period corresponding the regulatory standards).

In some embodiments, the microcontroller may send control signals to components that are part of the refrigerant sensor system, such that the components (e.g., relays) may provide output signals that are indicative of states (e.g., high or low) of the respective components. The output signal may then be provided to other equipment or devices that control refrigerant mitigation operations. Additionally, the microcontroller may provide control signals, which may correspond to state signals (e.g., high or low), to output ports of the refrigerant sensor system, and the output ports may be coupled to digital communication buses, which provide state data (e.g., high or low, on or off, binary data) to the equipment or devices that control refrigerant mitigation operations. In this way, the supply fans may function to purge the leaked refrigerant from the enclosure into the external environment until the leaked refrigerant concentration has dropped below a threshold concentration. The compressors and electrical devices may be shut off until the leak is no longer present or the refrigerant concentration is below the predetermined threshold to avoid operating while the refrigerant leak is present.

Figure 1:
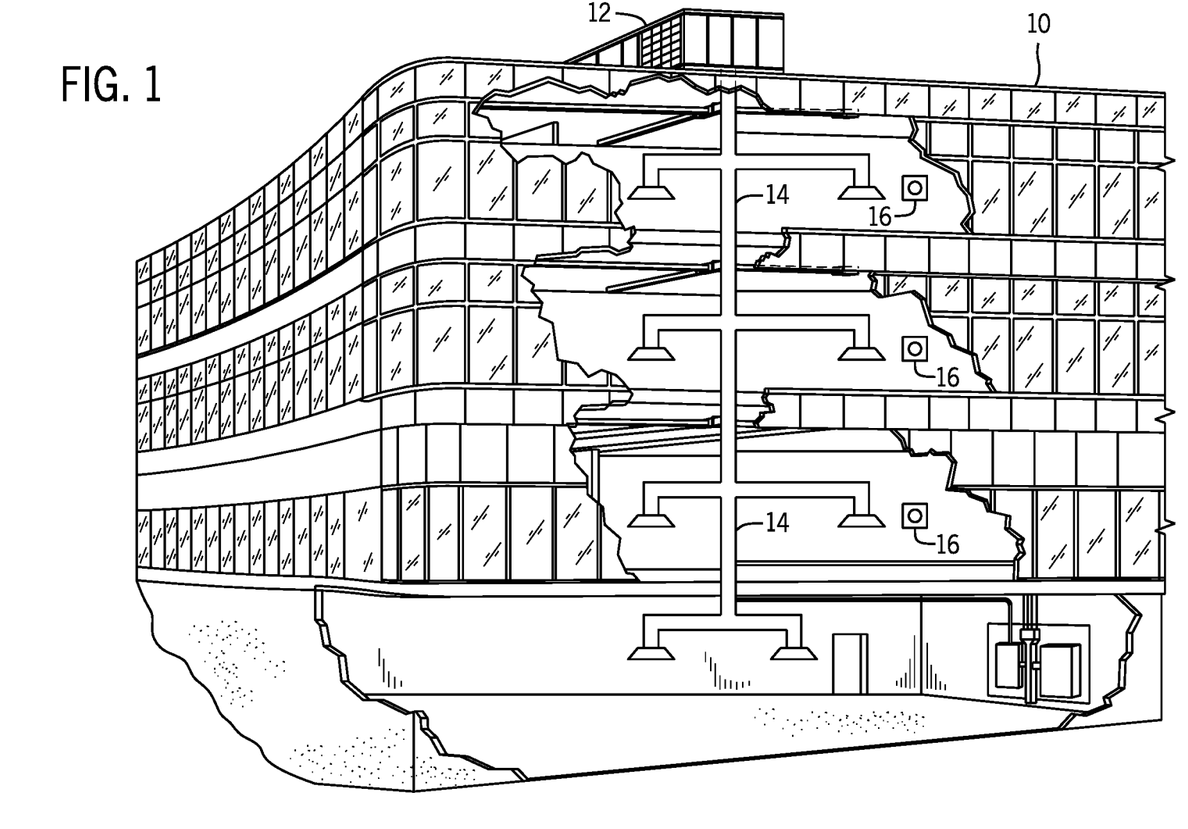
FIG. 1 is an illustration of an embodiment of a commercial or industrial HVAC system, in accordance with present techniques.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes a HVAC unit 12. The building 10 may be a commercial structure or a residential structure. As shown, the HVAC unit 12 is disposed on the roof of the building 10; however, the HVAC unit 12 may be located in other equipment rooms or areas adjacent to the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
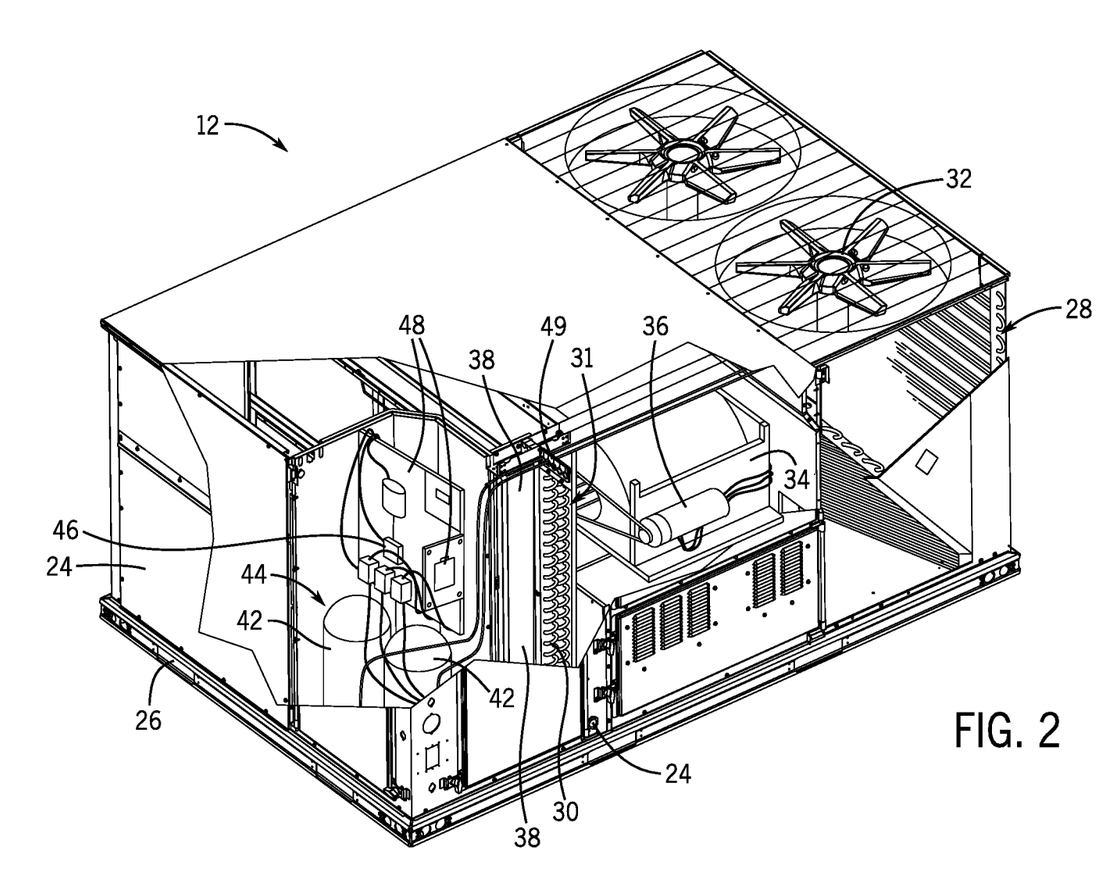
FIG. 2 is an illustration of an embodiment of a packaged unit of the HVAC system, in accordance with present techniques.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
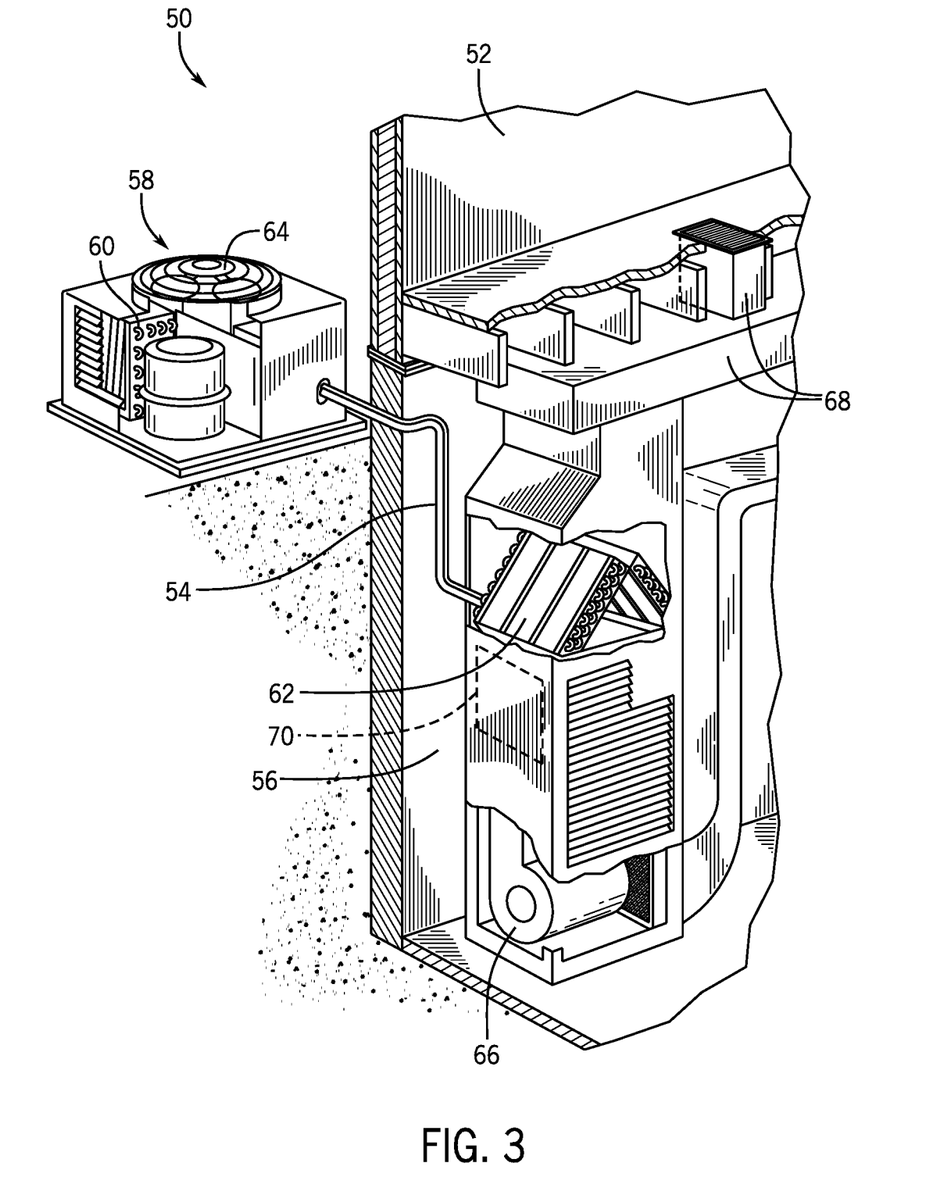
FIG. 3 is an illustration of an embodiment of a split system of the HVAC system, in accordance with present techniques.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger that is separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
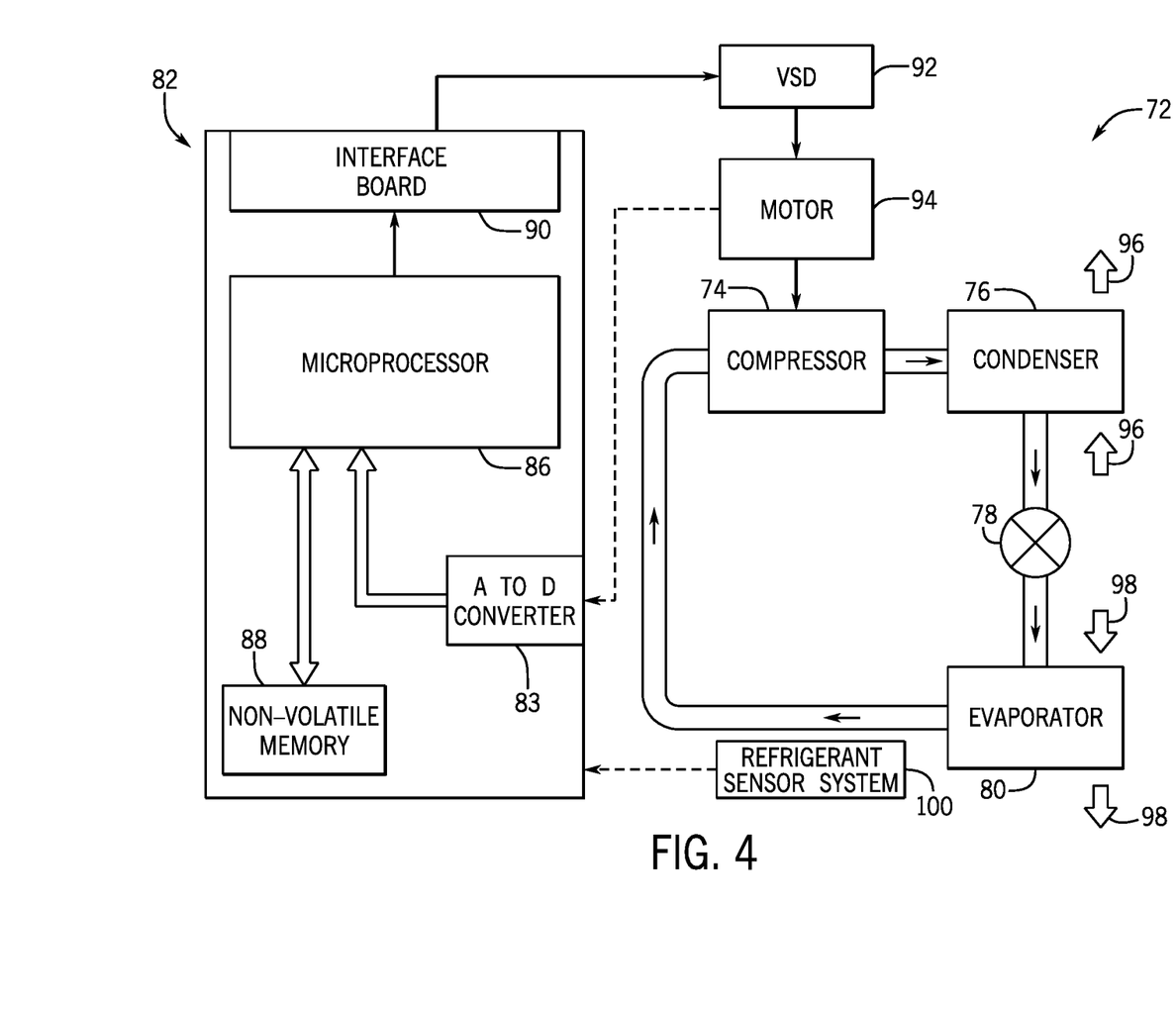
FIG. 4 is a schematic diagram of an embodiment of a refrigeration system of the HVAC system, in accordance with present techniques.

FIG. 4 is an embodiment of a vapor compression system 72 that can be used in any of the systems described above. The vapor compression system 72 may circulate a refrigerant through a set of components include a compressor 74. The set of components may also include a condenser 76, an expansion valve(s) or device(s) 78, and an evaporator 80. The vapor compression system 72 may further include a control panel 82 that may include an analog to digital (A/D) converter 83, a microprocessor 86, hardware logic 84, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may include one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

The vapor compression system 72 may include one or more sensors communicatively coupled to the control panel 82 to detect refrigerant leak faults and other types of equipment faults (e.g., high-pressure refrigeration override switches, fan overload). The one or more sensors may be any type of sensors, including electrochemical gas detectors, catalytic bead sensors, photoionization detectors, infrared point sensors, infrared imaging sensors, semiconductor sensors, ultrasonic gas detectors, holographic gas sensors, pressure sensors or any other suitable sensors capable of detecting a concentration of the refrigerant and/or detecting high pressure switch trips. Moreover, the refrigerant leak management system may, additionally or alternatively, include other sensors suitable for detecting a presence of the refrigerant, such as temperature sensors, pressure sensors, acoustic sensors, flowrate sensors, etc.

In addition to the sensors described above, the control panel 82 may be coupled to a refrigerant sensor system 100 that may include one or more refrigerant sensors (e.g., R32 refrigerant sensors), a microcontroller, and a power supply. The power supply may be coupled to the microcontroller and the refrigerant sensor. In some embodiments, the refrigerant sensor system 100 may include an enclosure that houses the refrigerant sensors, the microcontroller, and the power supply. As such, the refrigerant sensor system 100 may be an independent piece of equipment or device that may be placed within the vapor compression system 72 to monitor the presence of refrigerants and perform certain operations based on data detected by the refrigerant sensors.

Moreover, the refrigerant sensor system 100 may include electrical components (e.g., relays) that may be used to output signals to other devices, which may rely on the received signals to perform certain operations. In any case, the microcontroller may receive data from the refrigerant sensors and perform certain operations based on an analysis of the data. The microcontroller may include any suitable type of processing device that may perform logic operations based on received data and generate output signals based on the analysis. The microcontroller may provide output signals (e.g., binary output, Voltage Analog Convertor (VAC), Sensor Actuator bus) may represent a state (e.g., low, high) to the control panel 82 or directly to one or more electrical components of the HVAC system. The state indicated in the output signal may be representative of whether the microcontroller detects the presence of the refrigerant or not. In some embodiments, the output signals may be provided to other electrical components that may be part of the HVAC system to control activation or deactivation of the one or more electrical components.

For instance, the microcontroller may receive the refrigerant concentration data from the refrigerant sensor, and based on the refrigerant concentration data, the microcontroller may determine that a refrigerant leak is present. For example, during operation of the HVAC system, a leak of the refrigerant may not be present when the concentration of the refrigerant 104 is below a lower management limit (e.g., lower flame limit per UL60335-2-30). However, when refrigerant leaks from a conduit and is detected by the one or more refrigerant sensors, the microcontroller receives the sensor data and determines that a non-zero concentration of the refrigerant is present within the sleeves around the conduits of the HVAC system. As a result, the microcontroller of the refrigerant sensor system 100 may generate one or more control signals, such that the control signals may represent a state in which the refrigerant leak is present. The control signals may be output to one or more electrical equipment inputs to cause the electrical equipment to activate or deactivate according to leak mitigation measures specified by industry standards.

Additionally, the microcontroller of the refrigerant sensor system 100 may compare the concentration of the refrigerant received from the one or more refrigerant sensors to some concentration threshold. The concentration threshold may be a user-set, technician-set, or distributor-set value that is stored within the control panel 82, either before or after the refrigerant sensor system 100 is placed into operation within the HVAC system. In some embodiments, the concentration threshold may be dynamically adjusted based on user input received by the microcontroller via communication channels (e.g., wired, wireless).

In response to determining that the concentration of the refrigerant is greater than or equal to the concentration threshold, the refrigerant sensor system 100 may send control instructions to one or more control systems of the HVAC system to implement leak mitigation measures (e.g., via electrical components, relays). This enables the operation and/or continued operation of the fans to maintain the sub-barometric pressure and other enables other mitigation measures (e.g., turning off compressors and heaters) to be implemented. In some embodiments, rather than continuously measure the one or more refrigerant sensor data the microcontroller may also wait some amount of time before determining the concentration of the refrigerant again, thus enhancing sensor life. In certain embodiments, the time threshold may be set as 1 minute, 5 minutes, 10 minutes, 60 minutes, or any suitable frequency.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, the HVAC system generally includes a refrigerant flowing within a refrigeration system. However, the refrigerant may inadvertently leak from a flow path of the refrigeration system due to wear or damage to components, faulty joints, or connections within the refrigeration circuit at some point after installation. If undetected, leaking refrigerant may compromise system performance or result in increased costs.

With this in mind, the present embodiments described herein incorporate the refrigerant sensor system 100 to enable the HVAC system to detect a refrigerant leak and perform mitigation measures to reduce the concentration of refrigerant within the HVAC system and disperse the refrigerant into the outside environment via the air supply fan, and suspend compressor and other equipment operations to avoid damage to these components due to the refrigerant leaks. In this way, the present embodiments may perform the mitigation measures by utilizing a refrigerant sensor system that enables a refrigerant sensor to be used to detect refrigerant concentrations and send data to a microcontroller that may implement leak mitigation measures.

Figure 5:
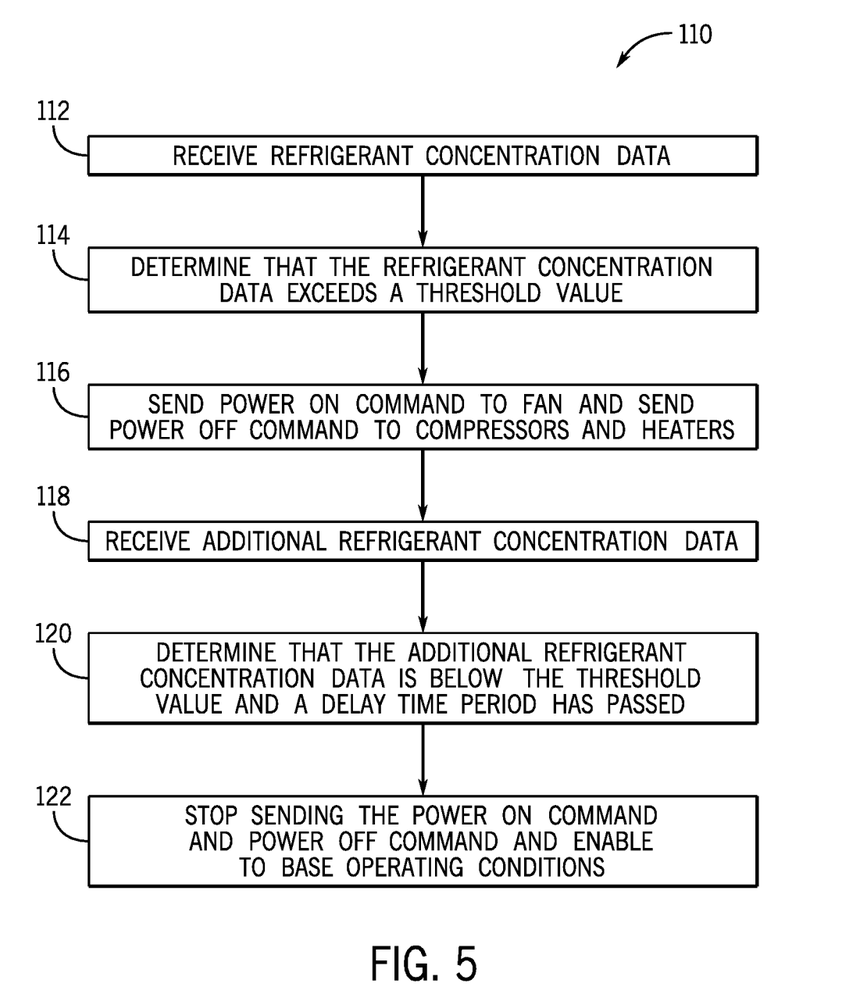
FIG. 5 is a flowchart of a method of refrigerant leak detection and mitigation for the refrigeration system of FIG. 4, in accordance with present techniques.

As discussed above, refrigerant leaks may occur in HVAC systems and certain mitigation actions relating to industry regulatory standards may be implemented to activate air supply fans and shut off compressors 74 and electrical equipment in response to detecting refrigerant leaks. To implement these mitigation measures, the HVAC system may employ the refrigerant sensor system 100 to detect refrigerant leaks and automatically send output signals to shut down compressors 74 and electrical equipment and activate an air supply fan to disperse the refrigerant according to regulatory standards. With the foregoing in mind, FIG. 5 illustrates a flowchart of a method 110 of refrigerant leak detection and mitigation for the refrigeration system 100 of FIG. 4, in accordance with the present disclosure. As will be discussed in more detail below, the method 110 of refrigerant leak management may be performed by the microcontroller that is part of the refrigerant sensor system 100. As such, the microcontroller may perform suitable control actions to mitigate the leaked refrigerant according to industry safety standards (e.g., ASHRAE 15-2019).

Before proceeding, it should be noted that any suitable processing device that may be part of the enclosed refrigerant sensor system 100 may perform the operations described below with reference to the method 110. In some embodiments, the method 110 may be performed by the one or more processors of a microcontroller housed in the refrigerant sensor system 100. While the method 110 is described using steps in a specific sequence, it should be understood that the present disclosure contemplates that the described steps may be performed in different sequences than the sequence illustrated, and certain described steps may be skipped or not performed altogether.

Referring now to FIG. 5, the microcontroller of the refrigerant sensor system 100 may, at process block 112, receive refrigerant concentration data from the refrigerant gas sensor disposed within the housing of the refrigerant sensor system 100. By way of example, the refrigerant concentration data may include time series data or instance data that includes a percent concentration of R32 refrigerant in the HVAC system. The refrigerant concentration data may also include raw data communicated from the refrigerant sensor in the form of an analog or digital signal to the processor. The microcontroller may then analyze the refrigerant concentration data to determine if the data exceeds some threshold indicating a refrigerant leak has occurred in the HVAC system. The predetermined threshold may correspond to a lower management limit (e.g., lower flame limit per UL60335-2-30), or any other suitable minimum concentration indicating a refrigerant leak.

At process block 114, the microcontroller may determine that the refrigerant concentration data exceeds the threshold refrigerant concentration value indicating that a refrigerant leak is present. In response to detecting that the refrigerant concentration exceeds the threshold value, the microcontroller may generate one or more control signals, which may be sent to certain electrical devices that may then manage refrigerant leak mitigation operations (e.g., according to ASHRAE-15 standards). The control signal may correspond to one state of a binary output signal (e.g., low, high), and the electrical equipment may use the binary output signal (e.g., representative of a state of the control signal) to control its operations (e.g., activate or deactivate).

For example, at process block 116, the microcontroller may send the control signal to the supply air fan 32 or a controller that controls operations of the supply air fan 32, and the control signal may cause the supply air fan 32 to operate at some speed or rotational rate in response to receiving the control signal. In some embodiments, the control signal may be a binary signal representative of a state (e.g., high, low). Additionally, the microcontroller may send instructions that include a control signal to the one or more compressors 74 to power down in response to receiving the control signal. Moreover, the microcontroller may send the instructions to any heaters and/or electrical devices located in the ductwork of the HVAC system to power down. It should be understood that the microcontroller may send commands to any component of the HVAC system to comply with regulatory standards for performing refrigerant leak mitigation and should not be limited to the commands described herein.

At process block 118, the microcontroller may receive additional refrigerant concentration data corresponding to refrigerant concentration at a later time. The microcontroller may determine that the additional refrigerant concentration data is now below the threshold refrigerant concentration. As such, the microcontroller may determine that the refrigerant leak is no longer present in the HVAC system. Additionally, the microcontroller may implement a time delay countdown to wait before modifying operations of the devices accessed at block 116. The delay value may be set according to ASHRAE 15-2019 fault standards, which specify the air supply fan should be activated for a minimum of five minutes after the refrigerant sensor system 100 has sensed a drop in refrigerant concentration below a specified value. In the same manner, the ASHRAE 15-2019 fault standards may specify that the one or more compressors 74 and one or more heaters should deactivate for a minimum of five minutes after the refrigerant concentration is no longer below the threshold value. Although the period of time is described above with reference to the ASHRAE 15-2019 fault standards, it should be noted that the time delay may be updated to reflect any regulatory standards or suitable time period specified by an individual or user.

The microcontroller may determine that the delay period of time has expired by monitoring a time delay countdown implemented via the microcontroller. In response to determining that the delay period of time has expired and the additional refrigerant concentration data is below the threshold value based on data received from the refrigerant sensor, the microcontroller, at block 122, may send updated control signals to the electrical equipment of the HVAC system to enable the electrical equipment to resume base equipment operations. That is, the updated control signals may cause the electrical equipment to reduce the fan speed, power on certain devices, and the like. In some embodiments, the updated control signals may include removing a binary output signal (e.g., from high to low) to cause the electrical equipment to adjust operations based on the state of the control signal. That is, in some embodiments the control signals may include providing a binary output signal (e.g., high or low voltage) that causes the electrical equipment to perform some operation based on the presence of the binary output signal or the lack of presence of the binary output signal. In this way, the microcontroller may change the state of the binary output signal (e.g., remove signal) in response to determining that the additional refrigerant concentration is below the threshold value at block 120.

By performing the embodiments described herein, the refrigerant sensor system 100 enables the HVAC system to implement mitigation actions when a refrigerant leak signal is detected after detecting the presence of the leak using the same standalone device. As such, the present embodiments reduces the use of multiple or separate elements (e.g., hardware control system) and enables a single refrigerant sensor system 100 to detect a refrigerant leak and implement control measures.

Figure 6:
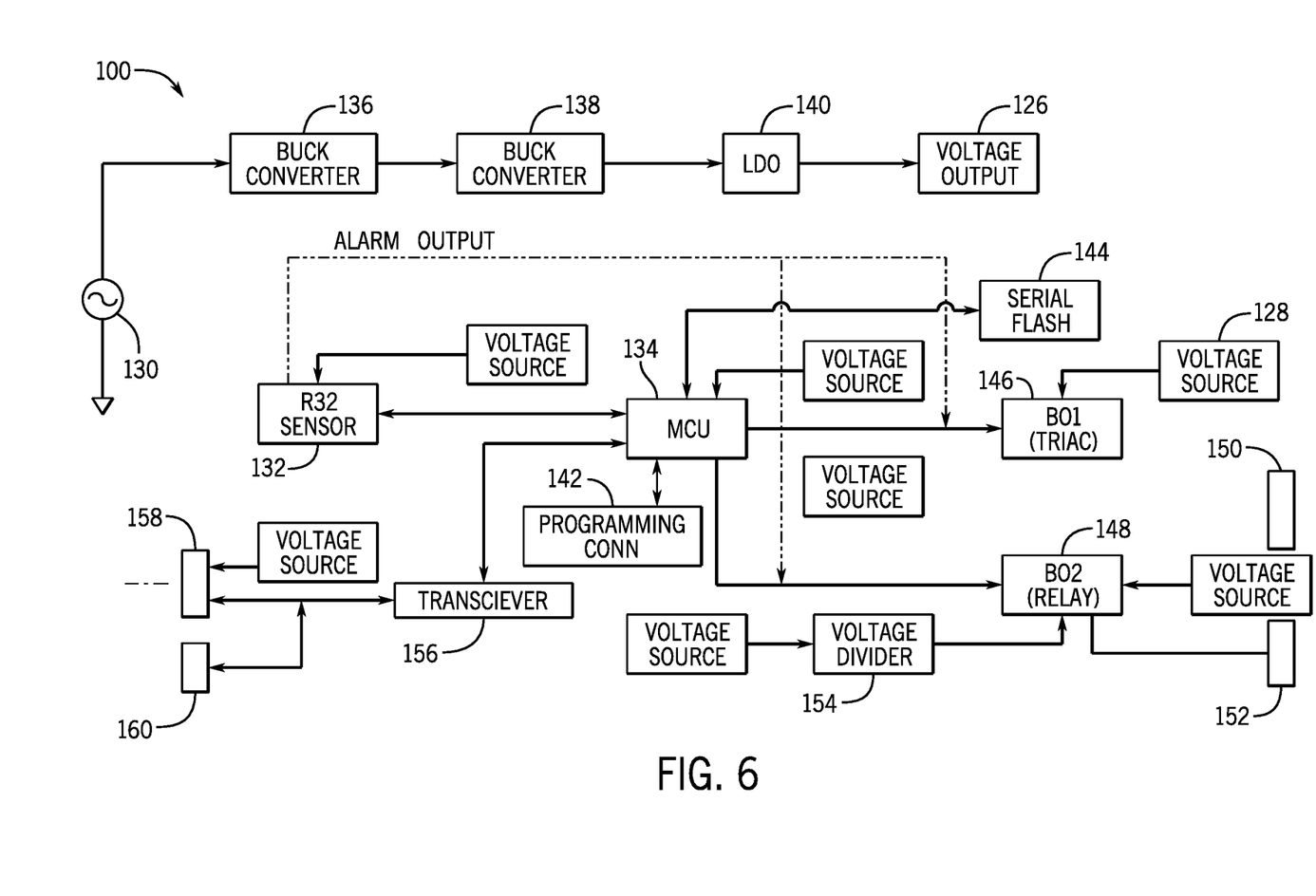
FIG. 6 is a schematic diagram of a refrigerant sensor system, in accordance with present techniques.

With the forgoing in mind, FIG. 6 is a schematic diagram of the refrigerant sensor system 100, in accordance with present disclosures. By way of example, the refrigerant sensor system 100 may include one or more power sources 130, a R32 refrigerant sensor 132, and a microcontroller 134. The one or more power sources 130 may include an alternating current (AC) power source or a direct current (DC) power source. The R32 refrigerant sensor 132 may function to detect refrigerant concentration in the HVAC system, and send the refrigerant concentration data to the microcontroller 134. Although the schematic diagram includes the R32 refrigerant sensor 132, it should be noted that any suitable refrigerant sensor capable of detecting a concentration of a particular refrigerant may be employed herein. The microcontroller 134 may then determine if a refrigerant leak is present based on the refrigerant concentration data, and send one or more control signals according to industry regulatory standards for refrigerant leaks in response to detecting a refrigerant leak.

The refrigerant sensor system 100 may include a power source 130 (e.g., battery) that may be coupled to one or more bulk convertors 136, 138. For example, the power source 130 may be coupled to a first bulk convertor 136 and a second bulk convertor 138 to reduce the voltage supplied by the power source 130 to the refrigerant sensor system 100 components. The voltage may then be reduced further at a low-dropout regulator (LDO) (e.g., 5V to 3.3V) 140. It should be understood that the power source may be directly coupled to the components of the refrigerant sensor system 100, or connected through any of the methods described above.

For example, the initial power source 130 may produce a 24 alternating current voltage (VAC). The first bulk convertor 136 may convert the 24 VAC to a 15 direct current voltage (VDC). The first bulk convertor 138 output may be coupled to the second bulk convertor 138 input that may receive the 15 VDC and convert the voltage value to 5 VDC. The second bulk convertor 138 output may be coupled to the low-dropout regulator 140 input which may lower the voltage from 5 VDC to 3.3 VDC. The 3.3 VDC may then be sent to multiple inputs of the refrigerant sensor system (e.g., R32 refrigerant sensor 132, microcontroller 134). It should be understood that although this power system for the refrigerant sensor system 100 is described above, any suitable power system to obtain a voltage output 126 may be implemented. The voltage output 126 of the power system may be used to power the R32 refrigerant sensor 132, the microcontroller 134, or the other hardware elements of the refrigerant sensor system 100 by providing one or more voltage sources 128 to the multiple hardware elements in the refrigerant sensor system 100. The R32 refrigerant sensor 132 may utilize the voltage source 128 to collect refrigerant concentration data. The voltage source 128 may be an alternating current (AC) voltage source or a direct current (DC) voltage source.

As discussed above, the R32 refrigerant sensor 132 may detect the concentration (e.g., percent volume of R32) of refrigerant (e.g., A2L refrigerant) within the HVAC system. The R32 refrigerant sensor 132 may be a gas sensor or any other suitable R32 refrigerant sensor. In some embodiments, the R32 refrigerant sensor 132 may be coupled to the microcontroller 134, and may send the refrigerant concentration data to the microcontroller 134 for further processing. The refrigerant concentration data may be sent in the form of via an analog or digital signal output from the R32 refrigerant sensor 132 to the microcontroller 134 via a wireless or wired connection method (e.g., Universal asynchronous receiver-transmitter (UART)). The microcontroller 134 may then analyze the refrigerant concentration data to determine if a refrigerant leak is present in the HVAC system.

The microcontroller 134 may be programmed at manufacture or a later time with threshold refrigerant concentrations corresponding to industry standards (e.g., ASHRAE-15 standards) for refrigerant concentrations indicating a refrigerant leak. This may be programmed via a programming connection 142 at the microcontroller 134 at the time of manufacture. The microcontroller 134 may also be programmed with one or more control actions corresponding to refrigerant leak mitigation measures. The one or more control actions may be programmed to the microcontroller 134 via the programming connection 142. For example, the microcontroller 134 may, at manufacture, be programmed to send certain control signals to components of the HVAC system in response to the refrigerant concentration data exceeding a threshold concentration value. The control signals may include signals to activate one or more air supply fans and signals to deactivate one or more compressor 74, heaters, or other HVAC electrical components according to industry standards for refrigerant leak mitigation. The microcontroller 134 may also communicate the refrigerant concentration data received from the R32 refrigerant sensor 132 to external devices and/or external components for further processing. Additionally, the refrigerant sensor system 100 may include a serial flash 144 component that enables field upgrades, hosts updated firmware images, or backup images for the components of the refrigerant sensor system 100.

As discussed above, the microcontroller 134 may be coupled to a transceiver 156 device (e.g., RS-485 interface) that may enable the refrigerant concentration data to be communicated to one or more remote systems such as other HVAC system components, central control units, external monitoring services, and the like via the transceiver 156. The transceiver 156 may be coupled to multiple output connections (e.g., RJ-11) that enable communication between the microcontroller 134 and external device components. For example, an external monitoring service may desire to receive refrigerant concentration values or instances of refrigerant concentration values exceeding a threshold value. The microcontroller 134 may communicate the refrigerant concentration data via the transceiver 156 to the external monitoring service for further processing and monitoring of one or more refrigerant leaks in the HVAC system. This may inform residents or mechanics associated with the HVAC system that a leak has been detected and leak mitigation actions are required. This enables users in residential spaces to directly control equipment of the HVAC system (e.g., supply air fans 32). In addition, the microcontroller 134 may receive data via the transceiver 156 to update threshold levels, adjust control operations in response to detecting the presence of the leak, and the like.

The microcontroller 134, based on the refrigerant concentration may determine that the refrigerant concentration values exceed a threshold value indicating a refrigerant leak. As discussed above, the microcontroller 134 may be programmed to implement control measures in response to detecting a refrigerant leak. The control measures may involve one or more signal outputs of the microcontroller 134 being sent to one or more electrical components of the HVAC system to implement certain conditions. If the microcontroller 134 detects more than the threshold concentration of refrigerant indicating a refrigerant leak, the microcontroller 134 may toggle an output signal from one state to another. That is, the microcontroller may modify a state (e.g., high or low) of the output signal sent to one or more electrical devices (e.g., compressors, heaters, and supply air fans) in the HVAC system. In some embodiments, the output may be a binary output signal sent to HVAC system electrical systems through a digital communication link, one or more intermediate hardware elements (e.g., triode for alternating current (TRAIC), relay), and the like. The output signal received by electrical devices that control certain aspects of the HVAC system may be received directly from the microcontroller or may be received via a relay device, a TRIAC device, or the like. With this in mind, the microcontroller may be coupled to one or more general purpose outputs (GPO) that drive connections to a triode for alternating current (TRIAC) device 146, to a relay switch (RELAY) device 148, or directly to electrical components that perform mitigating actions (e.g., activate or shut off electrical devices). The relay switch device 148 may also receive inputs from a voltage divider 154 to enable signal transmission via the relay switch device 148. It should be understood that although the TRIAC device 146 and relay switch device 148 are discussed above, any suitable device or hardware element may be used to output the control signals, binary signals, or other signals representative of a certain state to other electrical components.

As discussed above, the microcontroller 134 may send control output signals or other output signals to the TRIAC device 146, the relay switch device 148, or any other hardware component. The TRIAC device 146, the relay switch device 148, or other hardware component may then output a signal that represents a certain state (e.g., high or low) of the received signals. The state represented by the signals output by the TRIAC device 146, the relay switch device 148, or other hardware component (may control the activation or deactivation of one or more electrical devices in the HVAC system that receive the signals. By way of example, TRIAC device 146, the relay switch device 148, or other hardware component may output signals of 0 V and 24 VAC (or other suitable voltages) to represent low and high states, respectively. In some embodiments, the microcontroller 134 may output signals in as 0-10 VDC signals, 4-20 mA signals, or other suitable voltage/current signals directly to the electrical components used to mitigate refrigerant leak conditions in the HVAC system via a digital communication bus or other suitable electrical coupling.

The relay switch device 148 may be coupled to a three pin connection 152 or other electrical connector to enable transmission of control signals to HVAC electrical devices. Additionally, the TRIAC device 146 may be coupled to one or more spade terminals 150 or other electrical connector to enable transmission of control signals to compressors 72, heaters, and other electrical devices within the HVAC system.

By way of operation, in response to detecting a refrigerant leak, the microcontroller 134 may send a signal to the relay switch device 148 that, in turn, produces an output signal (e.g., representative of a state) that may be sent to one or more compressors 74 and may cause the compressors 74 to deactivate while the output signal is produced by the relay switch device 148. The output signal may be provided via a three pin connection 152 to the one or more compressors 74 or other output circuitry. As discussed above, the output signal may be switched from a 0 V state to a 24 VAC state (or any other suitable voltage/current states) in response to the microcontroller 134 determining that the refrigerant concentration exceeds the threshold value. The microcontroller 134 may determine at a later point in time that a refrigerant leak is no longer detected based on the refrigerant concentration data and, in turn, may stop transmitting the signal. As a result, the relay switch device 148 or other suitable component may change the state of the signal to 0 V. The one or more compressors 74 may then receive the updated signal to return to base operating conditions. Although one arrangement of components of the refrigerant sensor system is described above, it should be understood that any suitable arrangement of components may be used.

Although the foregoing description of the example schematic diagrams for hardware is described as being used to implement the techniques described herein, it should be noted that these schematic diagrams are provided for exemplary purposes. That is, the refrigerant sensor system 100 to implement the above-referenced techniques may include other arrangements, logic elements, and the like.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described, such as those unrelated to the presently contemplated best mode of carrying out the disclosure, or those unrelated to enabling the claimed features. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
 a heating, ventilation, and air conditioning (HVAC) system comprising one or more devices, wherein the one or more devices comprise a fan, a compressor, and a heater; and
 a sensor system, wherein the sensor system is a standalone device disposed within the HVAC system, and the sensor system comprises:
  a refrigerant sensor;
  a microcontroller configured to:
   receive refrigerant concentration data indicative of a first amount of refrigerant from the refrigerant sensor;
   determine that the first amount of refrigerant exceeds a first threshold;
   activate the fan, deactivate the compressor, and deactivate the heater by sending one or more signals to one or more components in response to a determination that the first amount of refrigerant exceeds the first threshold, wherein the one or more components comprise a relay device, a triode for alternating current (TRIAC) device, or both, and the one or more components are configured to couple to the one or more devices;
   receive additional refrigerant concentration data indicative of a second amount of refrigerant from the refrigerant sensor subsequent to the determination that the first amount of refrigerant exceeds the first threshold;
   implement a time delay period in response to a determination that the second amount of refrigerant is less than the first threshold; and
   deactivate the fan, activate the compressor, activate the heater, or a combination thereof, by sending one or more updated signals to the one or more components in response to expiration of the time delay period;
  a power source coupled to the refrigerant sensor and the microcontroller, wherein the power source comprises a battery and is configured to supply a voltage to the refrigerant sensor and the microcontroller, wherein the refrigerant sensor is configured to utilize the voltage to collect the refrigerant concentration data and the additional refrigerant concentration data; and
  a housing enclosing the refrigerant sensor, the microcontroller, and the power source, wherein the housing encloses the relay device, the TRIAC device, or both.

2. The system of claim 1, wherein the microcontroller comprises executable instructions configured to determine whether the first amount of refrigerant exceeds the first threshold.

3. The system of claim 1, wherein the microcontroller is configured to couple to a transceiver.

4. The system of claim 3, wherein the microcontroller is configured to send the refrigerant concentration data to an external device communicatively coupled to the transceiver.

5. The system of claim 1, wherein the refrigerant sensor comprises an R32 refrigerant sensor.

6. The system of claim 1, wherein the microcontroller is configured to update the first threshold based on receipt of an indication of a second threshold different from the first threshold.

7. A method, comprising:
receiving, by a processor disposed within a housing, a voltage provided by a power system comprising a power source disposed within the housing;
receiving, by a refrigerant sensor disposed within the housing, the voltage provided by the power system, wherein the refrigerant sensor is configured to collect refrigerant concentration data utilizing the voltage;
receiving, by the processor, the refrigerant concentration data indicative of a first refrigerant concentration from the refrigerant sensor;
determining, by the processor, that the first refrigerant concentration exceeds a first threshold value; and
controlling, by the processor, operation of a heating, ventilation, and air conditioning (HVAC) system by sending one or more signals to one or more components in response to a determination that the first refrigerant concentration exceeds the first threshold value, wherein the housing encloses the processor, the power source, and the refrigerant sensor to form an independent piece of equipment configured to be disposed within the HVAC system, wherein the one or more components are configured to couple to one or more devices to control operation of the HVAC system, wherein the one or more devices comprise a fan and a compressor, and wherein the one or more signals are configured to activate the fan, and deactivate the compressor.

8. The method of claim 7, further comprising:
receiving, by the processor, additional refrigerant concentration data indicative of a second refrigerant concentration subsequent to the determination that the first refrigerant concentration exceeds the first threshold value;
determining, by the processor, that the second refrigerant concentration is less than the first threshold value; and
sending, by the processor, one or more updated signals to the one or more components.

9. The method of claim 8, comprising:
executing, by the processor, a time delay period in response to determination that the second refrigerant concentration is less than the first threshold value; and
sending, by the processor, the one or more updated signals in response to a determination that the time delay period is expired.

10. The method of claim 7, comprising updating, by the processor, the first threshold value based on receipt of a user input indicative of a second threshold value different from the first threshold value.

11. A sensor device, comprising:
an R32 refrigerant sensor configured to detect refrigerant concentration data;
a microcontroller configured to:
receive data indicative of a refrigerant concentration from the R32 refrigerant sensor;
determine that the refrigerant concentration exceeds a first threshold value; and
control operation of a heating, ventilation, and air conditioning (HVAC) system by sending one or more signals to one or more components in response to a determination that the refrigerant concentration exceeds the first threshold value, wherein the one or more components are configured to couple to one or more devices to control operation of the HVAC system, wherein the one or more devices comprise a fan, a compressor, and a heater, and wherein the one or more signals are configured to activate the fan, deactivate the compressor, and deactivate the heater;
a power system comprising a power source and at least one voltage step-down component, wherein the at least one voltage step-down component is electrically coupled to the power source, the R32 refrigerant sensor, and the microcontroller, the power system is configured to output a voltage to the R32 refrigerant sensor and to the microcontroller, and the R32 refrigerant sensor is configured to collect the data utilizing the voltage; and
a housing enclosing the R32 refrigerant sensor, the microcontroller, the one or more components, and the power system.

12. The sensor device of claim 11, wherein the at least one voltage step-down component comprises one or more buck converters, one or more low-dropout regulators (LDOs), or both.

13. The sensor device of claim 11, wherein the one or more components comprise a relay device, a triode for alternating current (TRIAC) device, or both.

14. The sensor device of claim 11, wherein the microcontroller is configured to:
receive additional data indicative of an additional refrigerant concentration from the R32 refrigerant sensor;
determine that the additional refrigerant concentration is less than the first threshold value;
execute a time delay period upon the determination that the additional refrigerant concentration is less than the first threshold value; and
control operation of the HVAC system by sending one or more updated signals to the one or more components in response to expiration of the time delay period, wherein the one or more updated signals are configured to deactivate the fan, activate the compressor, activate the heater, or a combination thereof.

15. The sensor device of claim 11, wherein the power source comprises a battery, the at least one voltage step-down component comprises a buck converter, a low-dropout regulator, or both, and the power source is coupled to and is configured to output the voltage to the R32 refrigerant sensor, the microcontroller, or both via the buck converter, the low-dropout regulator, or both.

* * * * *